US006490638B1

(12) United States Patent
Ha et al.

(10) Patent No.: US 6,490,638 B1
(45) Date of Patent: Dec. 3, 2002

(54) GENERAL PURPOSE BUS WITH PROGRAMMABLE TIMING

(75) Inventors: Andrew Ha, New Braunfels, TX (US); Pratik M. Mehta, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/379,012

(22) Filed: Aug. 23, 1999

(51) Int. Cl.[7] .............................. G06F 13/10; G06F 1/04
(52) U.S. Cl. .............................. 710/15; 710/16; 710/58; 710/60; 710/305; 710/307; 710/313; 710/315; 713/501
(58) Field of Search .......................... 713/501; 710/15, 710/16, 58, 60, 305, 307, 313, 315

(56) References Cited

U.S. PATENT DOCUMENTS

| | | | | |
|---|---|---|---|---|
| 4,523,274 A | * | 6/1985 | Fukunaga et al. | 364/200 |
| 5,175,820 A | * | 12/1992 | Gephardt | 395/275 |
| 5,428,746 A | * | 6/1995 | Dalrymple | 395/275 |
| 5,548,766 A | * | 8/1996 | Kaneko et al. | 395/775 |
| 5,630,108 A | * | 5/1997 | Wichman et al. | 395/556 |
| 6,070,205 A | * | 5/2000 | Kato et al. | 710/100 |
| 6,134,638 A | * | 10/2000 | Olarig et al. | 711/167 |
| 6,260,098 B1 | * | 7/2001 | Ku | 710/130 |

OTHER PUBLICATIONS

*ISA System Architecture*, Tom Shanley & Don Anderson, 1995, pp. 21 through 26, 139 through 151, and 335 through 362.

*Élan ™ SC400 and Élan ™ SC410 Single–Chip, Low –Power, PC/AT–Compatible Microcontrollers*, Data Sheet, Advanced Micro Devices, Inc., Dec. 1998, pp. 1 through 132.

* cited by examiner

Primary Examiner—Jeffrey A. Gaffin
Assistant Examiner—Rehana Perveen
(74) Attorney, Agent, or Firm—Zagorin, O'Brien & Graham, LLP

(57) ABSTRACT

A system provides a general purpose bus with programmable timing capability. As part of a microcontroller, this general purpose bus provides a mechanism for communication between general purpose peripherals connected to the bus and enables external devices to be connected with proper timing to the microcontroller. The general purpose bus controller includes programmable interface timing control logic which allows the bus cycle length for commands from a processor or other bus master to be programmed. Accordingly, memory and I/O read and write commands are customized to suit the timing requirements of peripheral devices connected externally to the microcontroller. A significant variety of peripheral devices may thus be coupled to the microcontroller without requiring additional glue logic. The general purpose bus controller further includes an echo mode which permits accesses to internal peripheral devices to be interpreted by a logic analyzer or other debugging equipment.

21 Claims, 7 Drawing Sheets

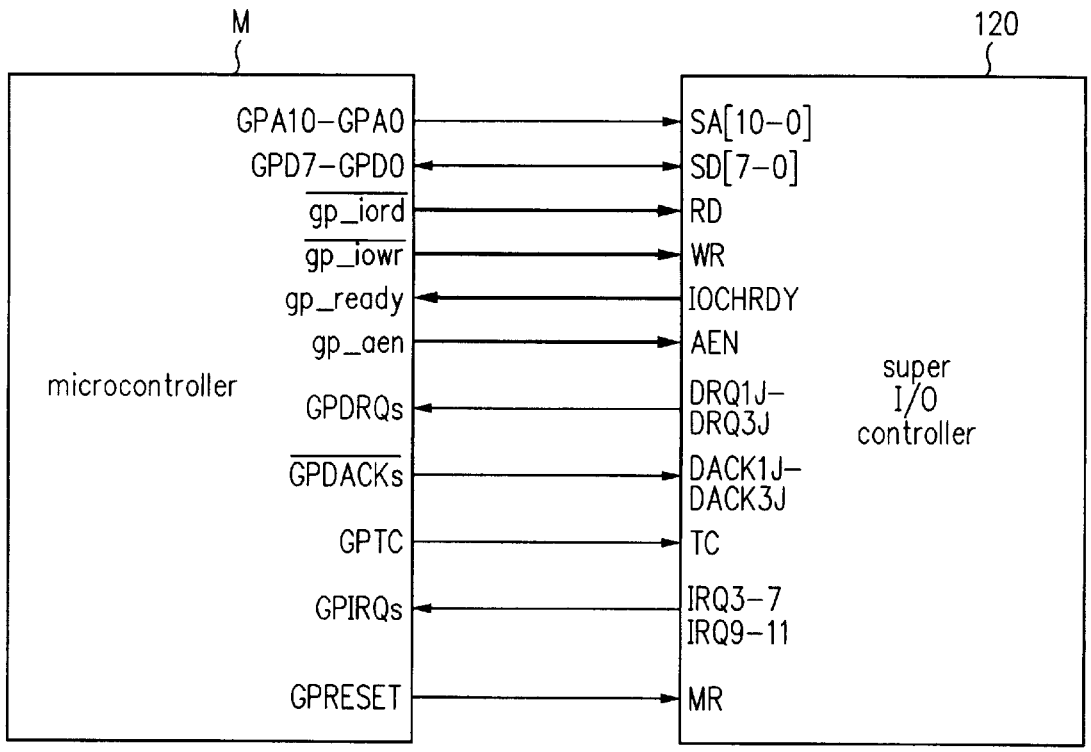

FIG. 5a

| super I/O controller chip requirements | programmable interface timing control registers[1] | results[2] |
|---|---|---|
| chip select signal:<br>  offset: none<br>  pulse width: none<br>  recovery: 45 ns | chip select offset = 00h<br>chip select pulse width = 00h<br>chip select recovery = 02h | OFFCS = 30 ns<br>PWCS = 30 ns<br>RCS = 90 ns |
| read signal:<br>  offset: 18 ns<br>  pulse width: 60 ns | read offset = 00h<br>read pulse width = 01h | OFFRD = 30 ns<br>PWRD = 60 ns |
| write signal:<br>  offset: 18 ns<br>  pulse width: 60 ns | write offset = 00h<br>write pulse width = 01h | OFFWR = 30 ns<br>PWWR = 60 ns |
| address latch enable:<br>  offset: none<br>  pulse width: none | ALE offset = 00h<br>ALE pulse width = 00h | OFFALE = 30 ns<br>PWALE = 30 ns |
| [1] for system using Tclk=30ns | | |
| [2] using (reg_val +1) * Tclk | | |

FIG. 5b

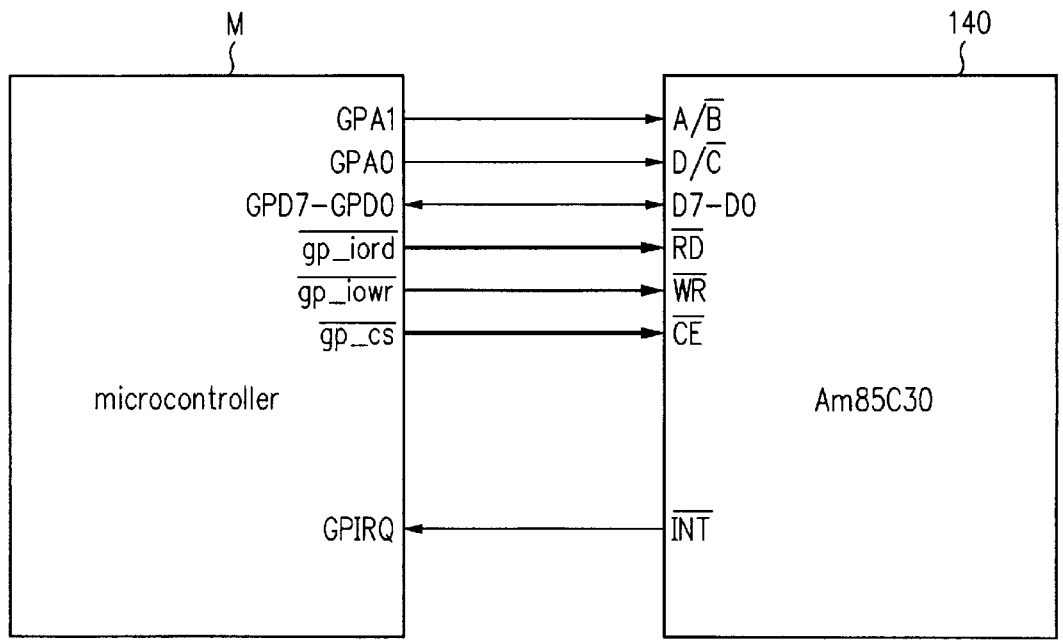

FIG. 6a

| AM85C30 chip requirements | programmable interface timing control registers[1] | results[2] |
|---|---|---|
| chip select signal:<br>  offset: 70 ns<br>  pulse width: 150 ns<br>  recovery: none | chip select offset = 02h<br>chip select pulse width = 04h<br>chip select recovery = 00h | OFFCS = 90 ns<br>PWCS = 150 ns<br>RCS = 30 ns |
| read signal:<br>  offset: 70 ns<br>  pulse width: 150 ns | read offset = 02h<br>read pulse width = 04h | OFFRD = 90 ns<br>PWRD = 150 ns |
| write signal:<br>  offset: 70 ns<br>  pulse width: 150 ns | write offset = 02h<br>write pulse width = 04h | OFFWR = 90 ns<br>PWWR = 150 ns |
| address latch enable:<br>  offset: none<br>  pulse width: none | ALE offset = 00h<br>ALE pulse width = 00h | OFFALE = 30 ns<br>PWALE = 30 ns |
| | | |
| [1]for system using Tclk=30ns | | |
| [2]using(reg_val +1) * Tclk | | |

FIG. 6b

GENERAL PURPOSE BUS WITH PROGRAMMABLE TIMING

BACKGROUND OF THE INVENTION

1. Field of the Invention

The present invention generally relates to bus architectures within systems, and more particularly to a general purpose bus with programmable timing capability.

2. Description of the Related Art

A bus provides a mechanism for communication between components of a system or microcontroller. A bus is essentially a collection of wires through which data may be transmitted from one part of a system to another part of the system. In a computer system, for example, a bus connects all the internal components of the computer to the central processing unit, or CPU, and to main memory.

Buses are generally thought to be made up of three elements: an address portion, or address bus, a data portion, or data bus, and a control portion, or control bus. The address bus specifies the location from where the data is either retrieved or submitted. The data bus transfers the actual data. The control bus contains control signals which coordinate activities between the sender, the receiver, and between the address and data buses as well. For example, one signal of the control bus may indicate whether the processor is currently reading from or writing to main memory. Another signal of the control bus may indicate whether an I/O port or main memory is being accessed.

A bus cycle can be viewed as a complete set of operations necessary between the address, data and control buses in order for a command to be processed in a system. Because a system may include a variety of components with different requirements, these components may run at different speeds. Buses are typically designed to run with fixed timing and a fixed protocol. Peripheral components with timing and protocols different from the bus may therefore not be connected to the bus. Accordingly, to support a particular peripheral component, a bus design typically may not support other peripheral components whose timing and protocol requirements differ.

One of the better known buses for personal computers is known as the industry standard architecture, or ISA, bus. The first ISA bus was 8 bits wide and ran at 4.77 MHz. Then, it was changed to a 16-bit data width and its clock speed was increased to 8 MHz. The desire to support devices which depend on these criteria has kept the ISA standard from improving since 1984.

SUMMARY OF THE INVENTION

Briefly, the illustrative system provides a general purpose bus with programmable timing capability. This general purpose bus provides a mechanism for communication between external components connected to the bus and other parts of the system or microcontroller. Because the general purpose bus is programmable, peripheral components with different timing and protocol requirements may simultaneously occupy the bus. Thus, for example, both ISA bus peripherals which run at 4.77 MHz and those which run at 8 MHz can be connected to the general purpose bus. Further, for embedded system designs which so desire, the general purpose bus may be programmed to emulate an ISA bus.

In one embodiment, a microcontroller includes peripheral components, such as UARTs, a watchdog timer, a real-time clock, and a programmable interrupt controller, all of which are internal to the microcontroller. These internal peripheral components are connected to the general purpose bus. Additionally, the microcontroller supports the connection of external peripheral components, also using the general purpose bus. Accordingly, the general purpose bus of the illustrative system includes an internal and an external portion.

The general purpose bus is coupled to a general purpose bus controller which includes registers for programmable timing of the bus. These registers provide the capability to program the bus cycle length for several signals which are used to communicate with external devices connected to the general purpose bus. In one embodiment, these programmable signals include eight chip selects, to support up to eight external peripheral devices. Additionally, read strobes for both memory and I/O read commands, write strobes for both memory and I/O writes, and address latch enable signals are programmable for each external peripheral component connected to the bus.

By programming the registers of the general purpose bus controller, a customized bus cycle for external peripheral components is provided. The registers enable programming of the offset, the pulse width, and the recovery time, resulting in a preferred bus cycle length for each external device. In the disclosed embodiment, the bus cycle may be as short as 90 nanoseconds or as long as 23 microseconds.

Additionally, the general purpose bus provides an echo mode which is useful for debugging. In the disclosed embodiment, the general purpose bus controller provides one programmable timing set for the external peripheral devices and one fixed timing set for the internal peripheral devices. However, when the echo mode is enabled, the internal general purpose bus cycle is echoed out on the external pins of the microcontroller, making the signal available to logic analyzer or other debugging equipment. During echo mode, accesses to internal peripheral devices utilize the programmed timing set. This ensures that no timing conflict with other external peripheral devices occurs.

By including this flexible bus in a microcontroller, external peripheral devices may be coupled to the microcontroller architecture with relative ease. In particular, embedded system designers may connect peripheral devices using no additional real estate, such as programmable array or other glue logic. Such peripheral components may include single-function chips, such as a programmable interrupt controller, or a programmable interval timer. Additionally, this flexible bus may support multi-function chips, such as a super I/O controller or a serial communications controller. For each of these peripheral components, the bus cycle may be programmed to suit the timing requirements of the external device, thus optimizing the throughput of the system.

BRIEF DESCRIPTION OF THE DRAWINGS

A better understanding of the illustrative system can be obtained when the following detailed description of the disclosed embodiment is considered in conjunction with the following drawings, in which:

FIG. 4a is a block diagram of the programmable interface timing control logic of the general purpose bus controller of FIGS. 1 and 2 including its register components;

FIG. 4b is a bus timing diagram of the programmable signals associated with the programmable interface timing control logic of FIG. 4a;

FIG. 5a is a block diagram of a Super I/O Controller chip coupled to the microcontroller of FIG. 1;

FIG. 5b is a table showing the timing requirements for the Super I/O Controller chip of FIG. 5a and the resulting bus cycle register programming and results according to one embodiment;

FIG. 6a is a block diagram of an enhanced serial communications controller coupled to the microcontroller of the illustrative system; and FIG. 6b is a table of the timing requirements for the enhanced serial communications controller of FIG. 6a and the resulting bus cycle register programming and results according to the exemplary embodiment.

DETAILED DESCRIPTION OF PREFERRED EMBODIMENT

The following related patent application is hereby incorporated by reference as set forth in its entirety:

U.S. patent application, bearing Attorney Docket No. A99113US, entitled FLEXIBLE MICROCONTROLLER ARCHITECTURE, filed concurrently;

U.S. patent application, bearing Attorney Docket No. A99118US, entitled METHOD AND APPARATUS FOR OVERLAPPING PROGRAMMABLE ADDRESS REGIONS, filed concurrently; and U.S. patent application, bearing Attorney Docket No. A99112US, entitled PC/AT-COMPATIBLE MICROCONTROLLER.

Figure 1A:
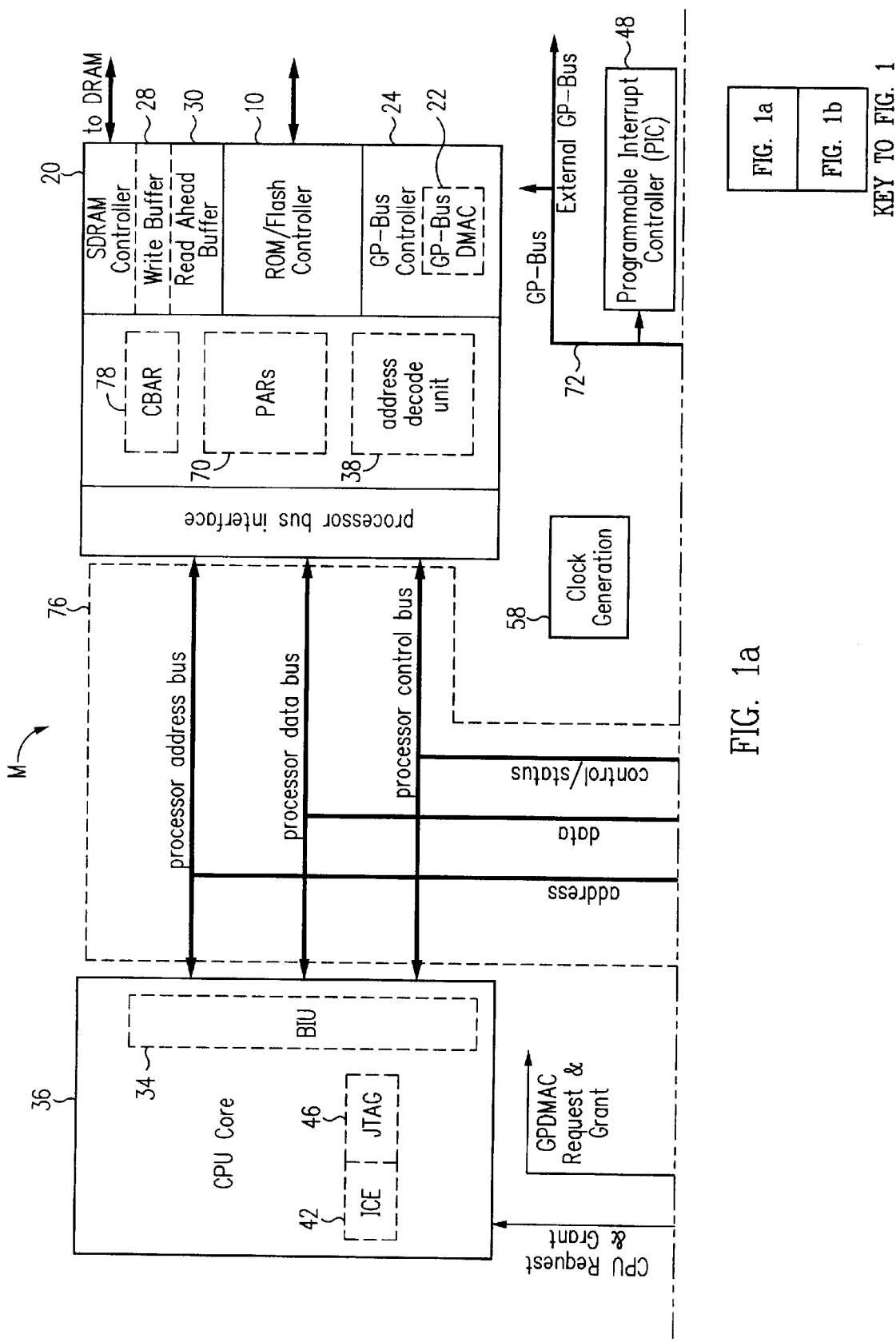
FIG. 1 is a block diagram of some components (including a general purpose bus and a general purpose bus controller) of an exemplary microcontroller according to one embodiment.
Figure 1B:
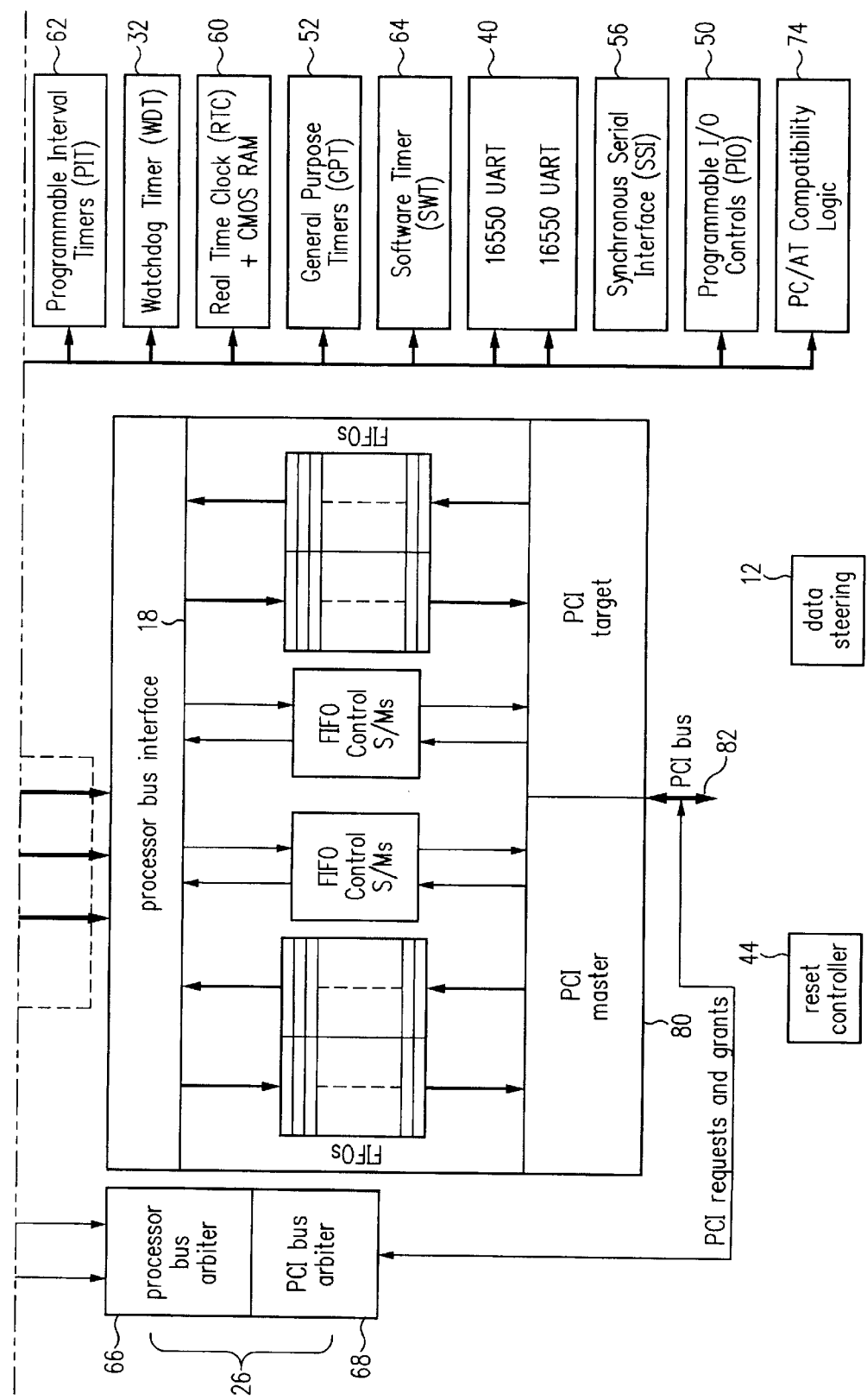

Turning now to the drawings, FIG. 1 shows a typical microcontroller M in accordance with the present invention. The microcontroller M provides a highly integrated CPU 36 with a complete set of peripherals that are superset of common PC/AT peripherals and with a set of memory mapped peripherals. In the disclosed exemplary embodiment, the CPU 36 is the Am5x86 CPU core, which utilizes the industry standard x86 microprocessor instruction set. The CPU 36 includes an integrated 16K write back cache.

The microcontroller M provides Programmable Address Region (PAR) registers 70 that enable flexible placement of memory and peripherals into a memory address space and an I/O address space. The PAR registers 70 also allow control of important attributes like cacheability and write protection for memory resources. Both the PAR registers 70 and a Configuration Base Address register (CBAR) 78 serve as address decode registers. While the PAR registers 70 are memory-mapped, the CBAR 78 is direct-mapped to I/O.

An address decoding unit (ADU) 38 provides flexible distributed memory and I/O address decode logic. Address decode is distributed between a general purpose (GP)-Bus Controller 24, memory controllers such as a read-only memory (ROM) controller 10 and a dynamic random access memory (DRAM) controller 20, and a Peripheral Component Interconnect (PCI) bus 82. PC/AT-compatible peripherals are direct-mapped to I/O, and remaining integrated peripherals are memory-mapped. The memory space and I/O space of a general purpose bus 72 are accessible by the CPU 36. The memory space and I/O space of the PCI bus 82 are accessible by the CPU 36, the PCI master controller 80, and external PCI bus masters.

A system arbiter 26 includes an arbiter 66 for performing arbitration for a processor bus 76 (shown divided into its address, data, and control portions) and an arbiter 68 for performing arbitration for the PCI Bus 82. The processor bus arbiter 66 may arbitrate between several possible processor bus masters. For example, the processor bus arbiter 66 may handle requests for the CPU 36, the general purpose bus DMA controller 22, and the PCI host bridge 18 on behalf of an external bus master requesting access to DRAM. The PCI bus arbiter 68 may arbitrate between five possible PCI masters.

A processor bus interface 78 is responsible for DMA cache snooping, dynamic clock speed adjusting, dynamic bus sizing, ready signal consolidation, Memory Mapped Configuration Region (MMCR) control, and general purpose address control. A bus interface unit, or BIU, 34 basically assists the CPU 36 with bus, DMA, and memory control.

A clocks module 58 provides oscillators and phase locked loops (PLLs) to support the DRAM controller 20, UARTs 40, general purpose timers (GPT) 52, and a real-time clock (RTC) 60.

The DRAM controller 20 provides SDRAM (synchronous DRAM) support, symmetric and asymmetrical DRAM support, SDRAM auto refresh support, SDRAM Error Correction Code (ECC) support, DRAM write buffering support, DRAM read pre-fetching support, read-around-write support, and support for up to 256 megabytes of DRAM. The DRAM controller 20 may service requests from the CPU 36, the PCI host bridge 18 on behalf of an external PCI master, or the general purpose bus DMA controller and may issue commands to SDRAM devices. DRAM cycles may be also be initiated by a write buffer 28 or a read-ahead buffer 30 internal to the DRAM controller 20. The write buffer 28 and the read-ahead buffer 30 together provide buffering techniques to optimize DRAM system performance.

A data steering block 12 stores data and routes data as needed from 8/16-bit devices from/to the general purpose bus 72 to/from a CPU bus. On DMA SDRAM reads, the data steering block 12 may save data until the next address strobe.

A general purpose bus controller 24 controls the general purpose bus 72, an internal and external bus that connects 8- or 16-bit peripherals to the microcontroller M without glue logic. Features of the controller 24 include 8 external chip selects, programmable bus interface timing, "ready" signal support for external devices, and support for 8/16-bit I/O and memory mapped I/O cycles. In the disclosed embodiment, the general purpose bus 72 supports a programmable interrupt controller (PIC) 48, a programmable interval timer (PIT) 62, a watchdog timer (WDT) 32, the real-time clock (RTC) 60, the general purpose timers (GPT) 52, a software timer (SWT) 64, UARTs 40, a synchronous serial interface (SSI) 56, programmable I/O logic 50, and PC/AT compatibility logic 74.

The microcontroller M includes a DMA controller 22 (general purpose bus DMAC) on the general purpose bus 72. The controller 22 is shown integrated with the general purpose bus controller 24. The DMA controller 22 is designed to handle any DMA accesses between general purpose bus peripherals (internal or external) and DRAM. Features of the controller 22 includes support for up to 7 DMA request channels (with a maximum of 4 external requests), support for three 16-bit channels and four 8-bit channels, buffer chaining capability in enhanced mode, fly-by (single cycle) transfers between general purpose bus peripherals and DRAM, and variable clock modes. The controller 22 is PC/AT-compatible.

A PIO (programmable I/O) unit 50 provides PIO logic to support 32 programmable I/O signals (PIOs) to monitor signals and control devices not handled by other functions of the microcontroller M. The PIOs are shared with other functions on the microcontroller M.

A timers unit 52 provides general purpose timers for generic timing or counting applications. Features of the timers unit 52 include three 16-bit timers, two-stage cascading of timers, and several modes of operations.

An in-circuit emulator (ICE) core 42 provides an integrated debug interface for embedded hardware/software debug during a special debug mode, ICE mode. Controllability and observability may be achieved through a fast JTAG-compliant serial interface.

A PCI host bridge 18 is integrated into the microcontroller M which allows the CPU 36 to generate PCI master transactions and allows external PCI masters to access the microcontroller DRAM space. The PCI Host bridge 18 may be a 33 MHz, 32-bit PCI Bus Revision 2.2-compliant host bridge interface.

A PIC 48 includes 3 industry standard programmable interrupt controllers (PICs) integrated together with a highly programmable interrupt router. Two of the PICs 48 may be cascaded as slaves to a master PIC which arbitrates interrupt requests from various sources to the CPU 36. The PICs 48 may be programmed to operate in PC/AT-compatible mode. The router may handle routing of 33 various external and internal interrupt sources to the 22 interrupt channels of the three PICs.

A programmable interval timer (PIT) 62, which is compatible to 8254 PIT circuitry, is provided. The PIT 62 provides three 16-bit general purpose programmable channels, six programmable counter modes, and binary and BCD counting support.

The microcontroller M further includes an integrated reset controller 44 to control the generation of soft or hard resets to the CPU 36 and system resets to the various internal cores. The reset controller 44 provides a control bit to enable ICE mode after the CPU 36 has been reset.

An integrated ROM/Flash controller 100 provides a glueless interface to up to three ROMs, EPROMs, or flash devices. It supports asynchronous and advanced page-mode devices.

The RTC block 60 is compatible with the Motorola MC 146818A device used in PC/AT systems. The RTC 60 supports binary or BCD representation of time, calendar, and alarm, its own power pin and reset, 14 bytes of clock and control registers, 114 bytes of general purpose RAM, three interrupts sources, battery backup capability, and an internal RTC reset signal to perform a reset at power-up.

A synchronous serial interface (SSI) 56 provides efficient full-duplex and half-duplex, bi-directional communications to peripheral devices. Other features include clock speed programmable from 64 KHz to 8 MHz and multiple device enables.

A software timer (SWT) 64 is a peripheral on the GP-Bus 72 which provides a millisecond time base with microsecond resolution timing for software. The peripheral 64 includes a 16-bit millisecond up counter and a 10-bit millisecond up counter.

A test controller block 46 includes test logic such as the JTAG controller. The test logic is provided to test and ensure that the components of the microcontroller M function correctly.

A UART block 40 includes two PC16550-compatible UARTs, both capable of running 16450 and 16550 software. The UART block 40 supports DMA operation, a FIFO mode, an internal baud rate clock to handle baud rates up to 1.5M bits/s, false start bit detection, break detection, full-duplex operation, and other features.

A watchdog timer block (WDT) 32 is a mechanism to allow system software to regain control of the microcontroller M when the software fails to behave as expected. The watchdog timer block 32 supports up to a 30-second timeout with a 33 MHz CPU clock.

The PC/AT compatibility logic 74 provides PC/AT-compatible functions. The PC/AT compatible integrated peripherals include the DMA controller 22, the PIT 62, the PIC 48, the UARTs 40, and the RTC 60.

This particular microcontroller is merely illustrative. The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

Figure 2:
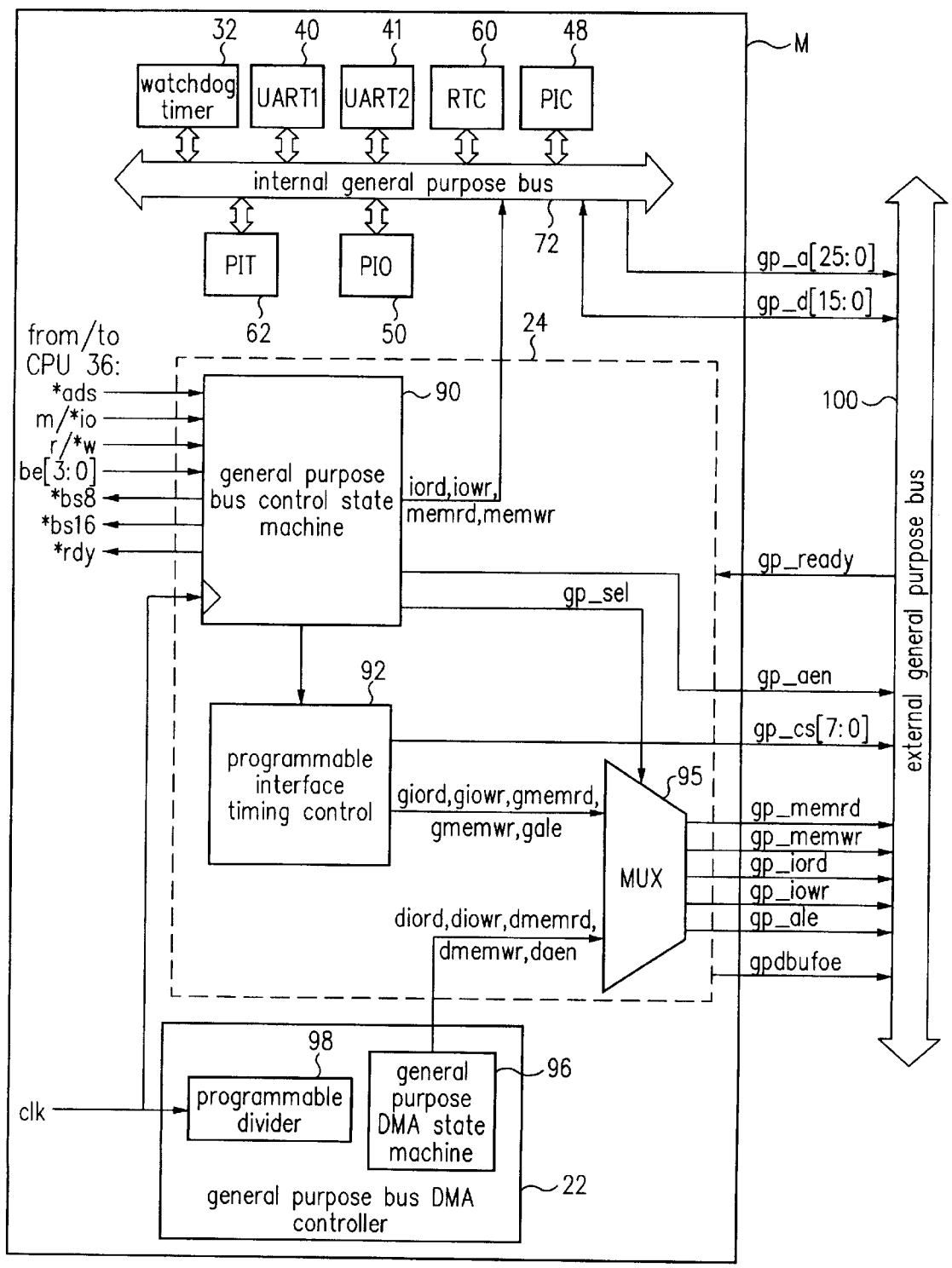
FIG. 2 is a block diagram of the components of the general purpose bus controller of FIG. 1 according to one embodiment.

FIG. 2 shows a more detailed depiction of the general purpose bus controller 24 of FIG. 1. For purposes of clarity, only signals which are relevant to understanding the function of the general purpose bus 72 and bus controller 24 and their relationship to other components of the microcontroller M are described in FIG. 2. The general purpose bus 72 is coupled to the general purpose bus controller 24 which includes registers or similar logic (FIG. 4) for programmable timing of the bus 72. These registers provide the capability to program several signals used to access external peripheral devices on the bus 72. In one embodiment, these programmable signals include eight chip selects, read strobes for both memory and I/O read commands, write strobes for both memory and I/O writes, and address latch enable signals.

The general purpose bus controller 24 includes a general purpose bus control state machine 90 coupled to a programmable interface timing control mechanism 92 and a multiplexer 95. The programmable interface timing control mechanism 92 contains the logic which allows bus cycles for external peripheral devices to be programmed. The programming of bus cycles is explained in more detail below in conjunction with the description of FIG. 3.

By programming the registers of the general purpose bus controller 24, a customized bus cycle for components attached to the microcontroller M can be provided. The registers enable programming of the offset, the pulse width, and the recovery time for each external device's bus cycle. By including this flexible bus 72 and its controller 24 in the microcontroller M, external peripheral devices may readily be coupled to the microcontroller architecture.

From the CPU 36, the general purpose bus control state machine 90 receives a number of signals. Included are an *ads signal, a m/*io signal, a r/*w signal, and a byte enable be[3:0] signal, all of which are input signals to the general purpose bus control state machine 90. (The star in front a signal name indicates that that signal is active low). Outputs from the general purpose bus control state machine 90 to the CPU 36 include a *rdy signal, which indicates when a bus cycle is completed, and either a *bs8 or *bs16 signal, which indicates the width of the general purpose bus 72 as either 8-bit or 16-bit.

The general purpose bus control state machine 90 is coupled to the programmable interface timing control logic 92 which generates any one of the gpcs[7:01], giord, giowr, gmemrd, gmemwr, or gp_ale signals, shown as outputs. Each of these signals is programmed according to the bus cycle parameters desired for each peripheral device connected externally to the microcontroller M. The giord, giowr, gmemrd, and gmemwr signals from the programmable interface timing control logic 92 and gaen from the general purpose bus control state machine 90 are then input to a multiplexer 95 along with analogous signals from a general purpose DMA state machine 96, which is part of the general purpose bus DMA controller 22, shown also in FIG. 1. Signals generated from the general purpose DMA state machine 96 include diord, diowr, dmemrd, dmemwr, and daen.

The multiplexer 95 of the general purpose bus controller 24 then selects inputs from either the programmable interface timing control mechanism 92 or the general purpose DMA state machine 96 according to a gp_sel signal received from the general purpose bus control state machine 90. As outputs from the multiplexer 95, any one of five signals may result. These five signals are shown in FIG. 2 as gp_memrd, gp_memwr, gp_iord, gp_iowr, or gp_aen, and are coupled to an external general purpose bus 100. The gp_sel signal ultimately decides which of the command signals (CPU or DMA) pass through the multiplexer 95 to the external general purpose bus 100.

FIG. 2 shows one signal going to the external general purpose bus 100, but does not show an analogous signal for the internal general purpose bus 72. This signal is the address latch enable, shown as gp_ale in FIG. 2. The address latch enable signal is a signal for latching the address signals on a local address bus into the latches for a system address bus. In FIG. 2, the local address bus corresponds to the internal general purpose bus 72 while the system address bus corresponds to the external general purpose bus 100.

For the microcontroller M, the address is actually available before gp_ale is asserted. However, ISA peripheral devices typically require an ALE signal to indicate the availability of an address on the ISA bus. Thus, to support such ISA peripheral devices, the address latch enable (gp_ale) signal indicates when an address which was on the internal general purpose bus 72 is now available to the external general purpose bus 100.

The general purpose bus controller 24 is shown coupled to the internal general purpose bus 72 and the external general purpose bus 100. As described in FIG. 1, above, the general purpose buses include an internal general purpose bus 72, which is inside the microcontroller M, and an external general purpose bus 100, which is external to the microcontroller M. As shown in FIG. 2, the internal general purpose bus 72 receives the following signals from the general purpose bus control state machine 90: iord, iowr, memrd, and memwr. The external general purpose bus 100 receives address signals GP_A[25:0] and data signals GP_D[15:0] from the internal general purpose bus 72. These signals essentially extend the internal general purpose address and data buses such that they are external to the microcontroller M.

The external general purpose bus 100, as shown in FIG. 2, receives signals gp_memrd, gp_memwr, gp_iord, gp_iowr, and gp_aen from the multiplexer 95. Also received from the general purpose bus controller 24 are gpcs[7:0] and gp_ale signals. The gpcs[7:0] signals are the chip select signals for up to eight external peripheral devices which may be attached to the external general purpose bus 100. The microcontroller M of the illustrative system provides programmable address region, or PAR, registers for programming these chip select signals. The PAR registers are discussed in more detail in the commonly assigned patent application, entitled "METHOD AND APPARATUS FOR OVERLAPPING PROGRAMMABLE ADDRESS REGIONS," previously incorporated herein by reference.

The internal general purpose bus 72 is shown coupled to a number of peripheral devices which are also described in FIG. 1. These peripheral devices are commonly found as part of PC-based or PC/AT-compatible systems. Peripheral devices, for example, may include a watch dog timer 32, a UART 40, a second UART 41, a real-time clock, or RTC 60, a programmable interrupt controller, or PIC 48, a programmable interval timer, or PIT 62, and a programmable I/O control mechanism, or PIO 50. These internal peripheral components operate off the internal general purpose bus 72. Accordingly, the internal peripheral components receive signals from the general purpose bus controller 24, much like the external general purpose bus 100 received the signals described above.

When the processor, or CPU, 36 intends to perform an operation with one of the external peripheral devices, the processor 36 sends signals to the general purpose bus controller 24. As stated above, four signals are received from the CPU 36 into the general purpose bus control state machine 90: *ads, m/*io, r/*w, and be[3:0]. Based on two signals (m/*io and r/*w), the general purpose bus control state machine 90 outputs one of four read/write signals: iord, iowr, memrd, or memwr. The address of the intended designee is on the internal general purpose bus 72 when *ads is asserted.

Likewise, the external general purpose bus 100 receive signals from the general purpose bus control state machine 90. However, the information received from the CPU 36, such as whether a memory or I/O access is being made, or whether a read or write command is being issued, first goes through the programmable interface timing control logic 92. As is further developed below, the programmable interface timing control logic 92 contains registers or similar logic which allow the programming of the bus cycles for chip selects, read strobes, write strobes, and address latch enable signals.

The general purpose bus 72 of the illustrative system provides programmable bus interface timing for external peripherals (not shown) connected to the external general purpose bus 100 of FIG. 2. The interface to the general purpose bus 100, that is, the command signals, can be programmed by software to control the interface timing between the general purpose bus 100 and the external peripheral devices. The bus interface timing is provided for chip selects gp_cs7 through gp_cs0, read strobes giord and gmemd, write strobes giowr and gmemwr, and address latch enable gp_ale.

The programmable interface timing control mechanism 92 is responsible for programming the bus cycle for any of the above signals. An exemplary group of registers is provided in the programmable interface timing control logic 92 for this purpose. These registers are described in more detail below in conjunction with the description of FIG. 4. First, a description of the bus cycle and its programmable portions is disclosed.

The bus cycle is separated into three portions, each of which can be independently programmed. These three portions include a period of time from the beginning of the bus cycle when the address is first valid, known as the offset, the valid signal period, known as the pulse width, and the period following the pulse width, known as the recovery. In the disclosed embodiment, the recovery portion of the cycle is relevant only for chip select signals, but determines the end of a bus cycle for all signals.

Figure 3:
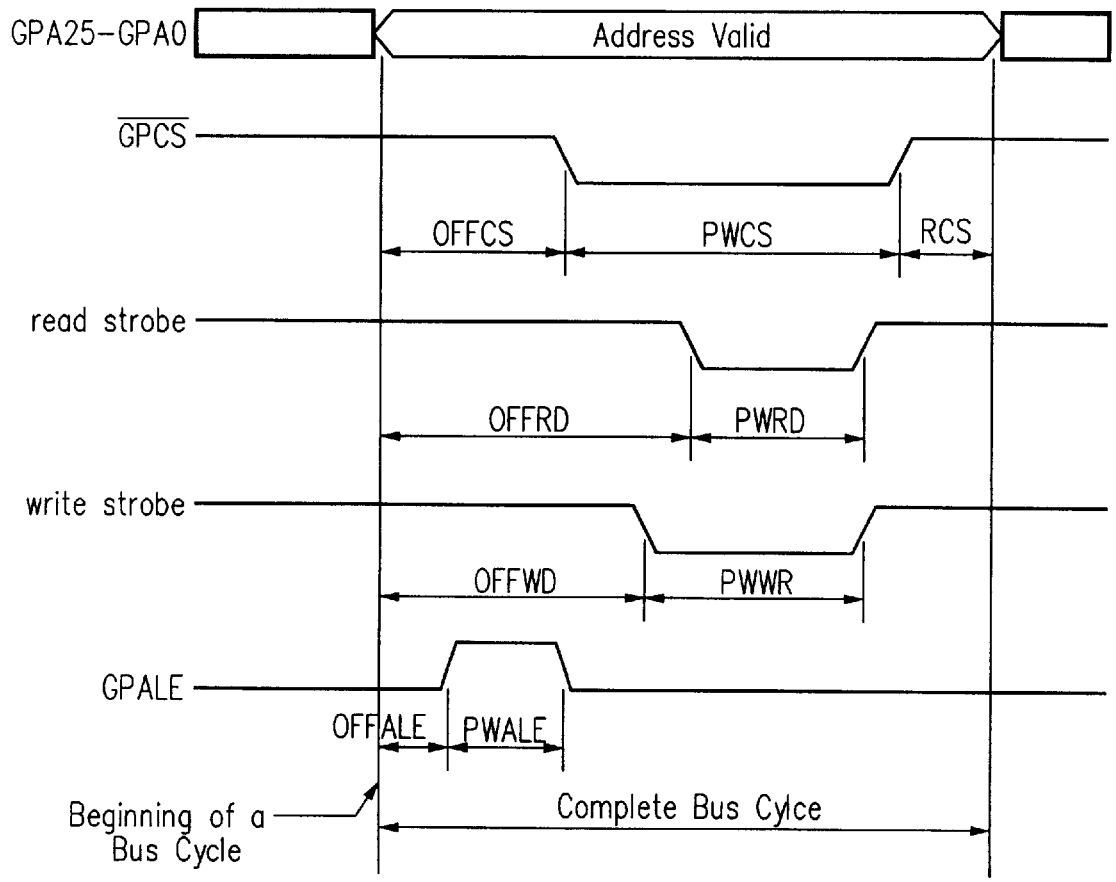
FIG. 3 is a bus timing diagram showing the programmable components of the general purpose bus controller of FIGS. 1 and 2.

FIG. 3 shows a timing diagram of the bus timing format, along with the associated programmable parameters. As the diagram illustrates, the beginning of a bus cycle is defined when the address first become valid (See GPA25-GPA0). The timing diagram also demonstrates that a complete bus cycle is the length of time during which the address is valid. As FIG. 3 shows, a general purpose chip select has three portions: this chip select offset, or OFFCS, the chip select pulse width, or PWCS, and the chip select recovery time, or RCS. These three variables represent the three bus cycle portions described above. The command signals, in contrast, require that only two of the bus cycles parameters be programmed. Accordingly, FIG. 3 shows a read strobe signal with two parameters: the read offset, or OFFRD, and the read pulse width, or PWRD. The write strobe signal is shown having two variables as well: the write offset, or OFFWR, and the write pulse width, or PWWR. The general purpose address latch enable signal also requires only two variables be programmed: the address latch enable offset, or OFFALE and the address latch enable pulse width, or PWALE.

The actual time of the bus cycle parameters can be calculated using the following formula:

$$(REG\_VAL+1) \times TCLK,$$

where:

REG_VAL=register content value and TCLK=internal clock period (30 ns).

In the disclosed embodiment, the internal clock period is 30 ns. Also, the minimum offset, pulse width and recovery time are 30 ns each. This results in a minimum bus cycle time of 90 ns. Since the offset, pulse width, and recovery parameters are each 8-bit values (maximum 255, in the disclosed embodiment), the longest bus cycle is 23 microseconds (usec).

As stated above, the programmable bus interface timing of the general purpose bus provides the capability to program eight chip selects gp_cs7 through gp_cs0. Chip selects are commonly used to enable a peripheral device for read and write processes. When a chip select signal is active, the CPU 36 can read data from or write data to the internal registers or memory of the peripheral device via the data bus using read and write signals.

In the disclosed embodiment, the programmed timing of the chip select for a peripheral device determines the overall length of the general purpose bus cycle.

Therefore, the timing parameters for the chip select are appropriately programmed.

This is useful even if the external peripheral does not require a connection to the chip select pin.

To ensure that the command strobes (that is, read or write commands) assert for the programmed time, in the disclosed embodiment, the bus cycle of the chip select is programmed to be longer than the programmed bus cycle of the command strobes. Similarly, to ensure that the address latch enable signal gp_ale is asserted for the programmed time, the bus cycle of the chip select for the peripheral device is programmed to be longer than the programmed bus cycle for address latch enable signal gp_ale. If the programmed chip select bus cycle is shorter than the programmed command strobes or address latch enable strobes, the command strobes could terminate or deassert before the programmed cycle time.

Figures 4A, 4B:
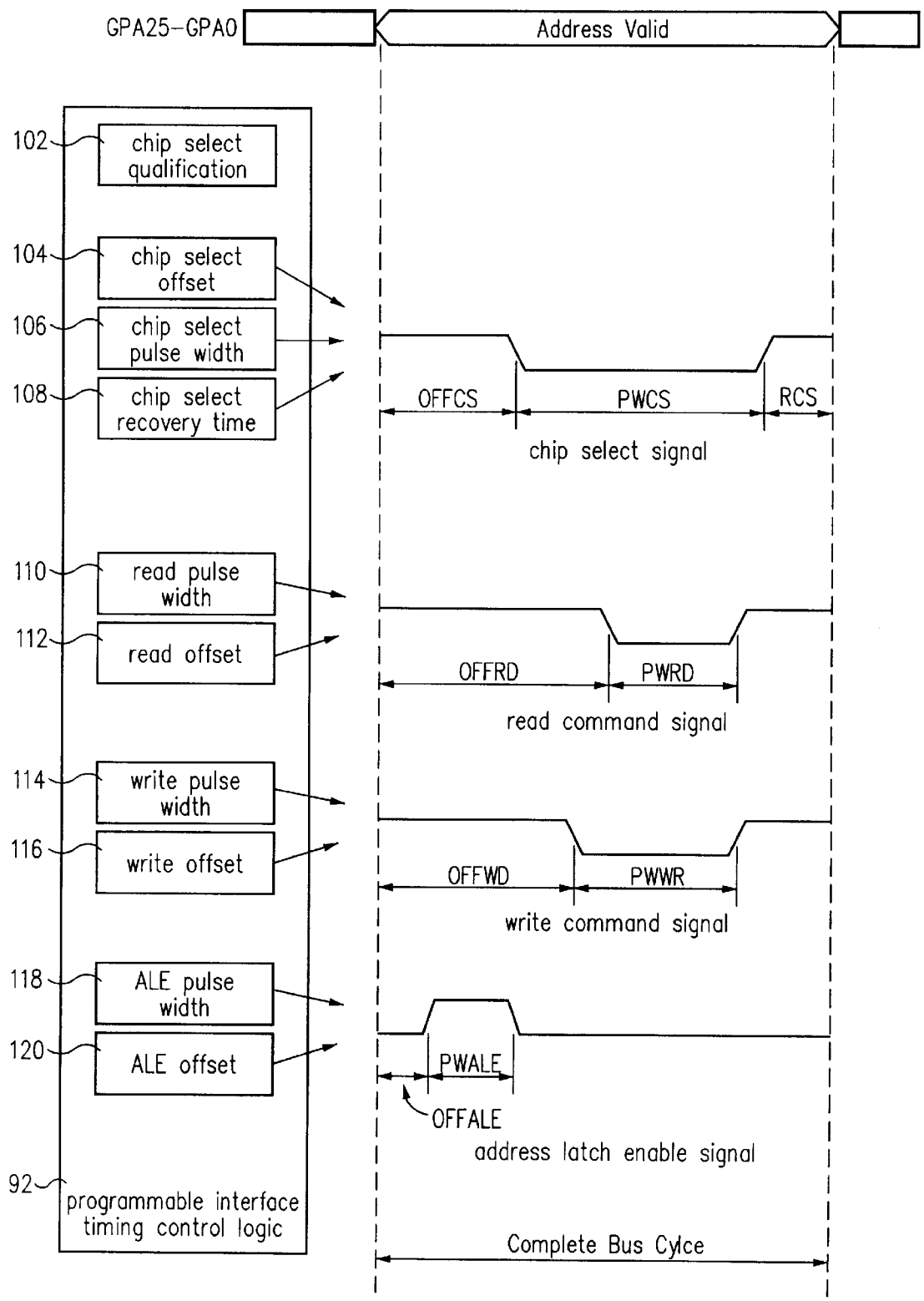

FIG. 4a shows the general purpose bus controller registers found in the programmable interface timing control logic 92, according to one embodiment. The programmable interface timing control logic 92 that was described in conjunction with FIG. 2 is now shown in more detail in FIG. 4a. The programmable interface timing control logic 92 includes a group of registers. These registers are used to program the lengths of the bus cycles depicted in FIG. 3.

First, a chip select qualification register 102 is shown. In the disclosed embodiment, all general purpose bus 100 chip selects can be qualified with the command strobes gp_iord, gp_iowr, gp_memrd, and gp_memwr by programming the general purpose chip select qualification register 102. When chip select qualification is enabled, the internal chip selects are logically "ANDed" with one or both of these command strobes. In a typical system environment, the read, write, and ALE command strobe signals are usually shorter than the chip select signals. In such cases, the external chip selects have timing that is identical to the command strobes.

The feature provided by the chip select qualification register 102 is useful for interfacing with buffer chips and transceivers without requiring external gates or logic. External buffers or transceivers may be employed to reduce loading on the general purpose bus 72. However, such devices have no chip selects, but only an enable and data direction input. Looking back to FIG. 2, a gpdbufoe signal is shown, provided by the general purpose bus controller 24. The gpdbufoe signal may be used to enable the buffer or transceiver while the qualified command, described above, may be used for the data direction. Thus, using the chip select qualification register 102 in conjunction with the gpdbufoe signal, no external logic is required to support the buffers or transceivers.

Next, FIG. 4a shows a chip select offset register 104, a chip select pulse width register 106, and a chip select recovery time register 108. These three registers are used to program the complete bus cycle for a chip select signal as well as one complete bus cycle. Accordingly, FIG. 4b shows the chip select signal of FIG. 3, along with its components OFFCS, PWCS and RCS. The chip select offset register 104 programs the OFFCS portion of the chip select signal; the chip select pulse width register 106 programs the PWCS portion of the chip select signal; and the chip select recovery time register 108 programs the RCS portion of the chip select signal.

FIG. 4a also shows a read pulse width register 110 and a read offset register 112. These registers are used to program the length of a bus cycle for a read command signal. Accordingly, FIG. 4b shows a read command bus cycle, with its OFFRD and PWRD portions. By programming the read offset register 112, the OFFRD portion of the read command signal is programmed, and by programming the read pulse width register 110, the PWRD portion of the read command signal is programmed.

Next, a write pulse width register 114 and a write offset register 116 are shown as part of the programmable interface timing control logic 92. As with the read registers 110 and 112, the write pulse width register 114 and write offset register 116 may be programmed to customize a bus cycle for a write command signal. The write command signal includes an offset portion, OFFWD, and a pulse width portion portion, PWWR. The write pulse width register 114 is used to program the PWWR portion of the write command signal while the write offset register 116 is used to program the OFFWD portion of the write command signal. Neither the read command nor the write command have a recovery portion. Thus, in this embodiment, there is no need for a read recovery or a write recovery register.

The programmable interface timing control mechanism 92 further includes an address latch enable pulse width register 118 and an address latch enable offset register 120. These two registers are programmed to produce a bus cycle for an address latch enable signal, as FIG. 4b illustrates. As with the read and write command signals, the address latch enable signal has both an offset portion, OFFALE, and a pulse width portion, PWALE. The ALE pulse width register 118 is used to program the PWALE portion of the address latch enable signal, while the ALE offset register 120 is used to program the OFFALE portion of the address latch enable signal. While an exemplary embodiment of the programmable interface timing logic 92 is shown in FIGS. 4a and 4b, it should be understood that other ways of implementing programmable interface timing logic are possible without departing from the spirit of the invention.

Although the general purpose bus controller 24 enables the bus cycle length to be customized for external peripheral devices, the bus cycle length can be further extended as required by the particular peripheral device. Looking back to FIG. 2, a signal from the external general purpose bus 100 to the general purpose bus controller 24 is shown as gp ready. The external peripheral device can issue the gp ready signal to the bus controller 24. The assertion of gp_ready during the pulse width portion of a command signal causes the length of the pulse width to be increased. This effectively gives the peripheral device more time to respond to the command. This delay period is commonly known as a wait state.

Alternatively, a bus cycle can be programmed conservatively to produce slower signals on the general purpose bus 100. In this case, however, gp_ready is not used to terminate the bus cycle earlier than programmed. The use of a ready signal is well known as a way to insert wait states in a bus cycle. In the disclosed embodiment, gp ready can be used to stretch a bus cycle but is not used to provide early termination of the cycle. Other embodiments of the general purpose bus controller 24 for accomplishing programmable timing for a general purpose bus are possible without departing from the spirit of the invention.

In the disclosed embodiment, the general purpose bus controller 24 provides programmable timing capability for devices connected to the external general purpose bus 100 while it provides fixed timing for devices connected to the internal general purpose bus 72. Thus, during normal operation, accesses to the integrated peripheral devices, such as the UART 40 or the RTC 60 shown in FIG. 2, are not visible on the external pins to the microcontroller M. However, to facilitate debug of the microcontroller M, an echo mode is provided by the general purpose bus controller 24. Echo mode is provided to view accesses to the internal general purpose bus 72 peripheral devices on the pins external to the microcontroller M. The signals are then available for detection by a logic analyzer or other debugging equipment. Echo mode thus facilitates the debug of system software on the microcontroller M.

In one embodiment, echo mode is enabled by writing to a register of the microcontroller M. When echo mode is enabled, accesses to the peripheral devices connected to the internal general purpose bus 72 that are "echoed" out utilize the timing which was programmed for the devices connected to the external general purpose bus 100. This ensures that no timing conflict with other external peripheral devices occurs during echo mode. In the illustrative system, devices connected to the internal general purpose bus 72 are typically faster than devices connected to the external general purpose bus 100. Therefore, when using the echo mode to debug the system, accesses to the integrated peripheral devices may be occurring at slower speeds to ensure compatibility with the external devices.

When echo mode is enabled, the gp_aen signal, shown in FIG. 2, is driven high during accesses from the processor 36 to the internal peripheral devices. This prevents devices connected to the external general purpose bus 100 from decoding or responding to these internal peripheral device accesses. When echo mode is disabled, the general purpose bus controller 24 does not assert gp_aen.

In the illustrative system, certain minimum general purpose bus timing is expected during echo mode. Table I shows the minimum general purpose bus timing register values to be programmed during echo mode.

TABLE 1 exemplary programming requirements during echo mode

| general purpose bus Signals | offset register | pulse width register | recovery time register |
|---|---|---|---|
| chip selects | 1 | 3 | 1 |
| read strobe | 1 | 3 | N/A |
| write strobe | 1 | 3 | N/A |
| address latch enable | N/A | N/A | N/A |

FIG. 5a shows an example of how the external general purpose bus 100 of the disclosed system can facilitate connection with the microcontroller M. In FIG. 5a, a super I/O controller 120, such as the PC87332VLJ of National Semiconductor of Santa Clara, Calif., is shown, coupled to the microcontroller M. In particular, the illustration shows how the signals described above, coming from the external general purpose bus 100, may be connected to the pins of the super I/O controller 120, according to one embodiment. A RD pin of the super I/O controller 120 is coupled to a *gp_iord signal. Also, a WR pin of the super I/O controller 120 is coupled to a *gp_iowr signal of the microcontroller M. As shown by the arrows in FIG. 5a, the super I/O controller 120 receives these signals from the external general purpose bus 100. Likewise, an AEN signal of the super I/O controller 120 is coupled to the gp_aen signal of the microcontroller M. Finally, an IOCHRDY signal of the super I/O controller 120 is coupled to a gp_ready signal of the microcontroller M. As the associated arrow indicates, the gp_ready signal is received by the microcontroller M from the super I/O controller 120. The super I/O controller 120 can thus use the gp_ready signal to lengthen the bus cycle, if needed, as described above.

By programming the registers of the programmable interface timing control logic 92, the ideal bus cycle times can be calculated for the chips select signals, the read strobe signal, the write strobe signal, and the address latch enable signal intended for the super I/O controller 120. FIG. 5b is a table which shows the chip requirements of the super I/O controller 120, the programmable interface timing control logic 92 register values programmed in accordance with those chip requirements, and the results of that programming.

The super I/O controller chip 120 does not have timing requirements for every parameter that is programmable. For example, no minimum bus cycle parameters are provided for the address latch enable signal. However, the super I/O controller 120 does specify a minimum recovery length for the chip select and specifies offset and pulse width lengths for both the read and write strobes.

In FIG. 5*b*, the internal clock period, or TCLK, is 30 ns. Using the formula (REG_VAL+1) * TCLK, the results shown in the third column of FIG. 5*b* can be derived from the programming values shown in the second column. For example, the read strobe pulse width chip requirement is 60 ns, as a minimum. The second column shows that the read pulse width register contains a 1. Using the formula, the PWRD parameter is 60 ns in length. This meets the chip requirement precisely. Looking at the parameters of the chip select signal, the total bus cycle length can be calculated. For the super I/O controller 120, then, the total bus cycle length is 150 ns.

FIG. 6*a* shows a microcontroller M coupled with a slower device than the super I/O controller 120 of FIG. 5*a*. In FIG. 6*a*, the microcontroller M is coupled to an AM85C30 enhanced serial communications controller 140. This enhanced serial communications controller was developed by Advance Micro Devices, of Sunnyvale, Calif., assignee of this application. In FIG. 6*a*, the programmable signals *gp_iord, *gp_iowr, and *gp_cs are shown coupled to the RD, WR, and CE signals of the AM85C30, respectively.

FIG. 6*b* is a table showing the chip requirements for the AM85C30 chip 140. As with FIG. 5*b*, the programmable interface timing control 92 registers are also shown, programmed according to the chip requirements. Finally, FIG. 6*b* shows the results of this programming in the third column. As with the super I/O controller 120 of FIG. 5*b*, the AM85C30 chip 140 does not specify minimum times for all signals. It is noted that the AM85C30 chip 140 has longer (meaning slower) pulse width requirements than the super I/O controller chip 120.

Again, looking at the chip select results, the total bus cycle length can be calculated. Here, for the AM5C30 chip 140, the total bus cycle length is 270 ns. The CS offset register 104 is programmed with a value of 02 h, giving an OFFCS value of 90 ns.

In addition to the foregoing applications, the general purpose bus 72 of the illustrative system may be programmed to emulate an ISA bus. In particular, such an implementation of the microcontroller M may be desired for embedded systems which must be PC/AT compatible.

The ISA bus supports a 16M address range requiring twenty-four address lines. Referring back to FIG. 2, the general purpose bus 72 includes two additional address lines, for a total address range of 64M. The ISA bus includes an CHRDY signal, which permits slower I/O peripheral devices to lengthen bus cycles by asserting the signal. Likewise, the general purpose bus 72 provides the signal gp_ready for this purpose.

The ISA bus further supports DMA and interrupt capability for peripheral devices connected to the ISA bus. Likewise, the general purpose bus 72 supports these common PC/AT features. Dynamic bus sizing is another feature of the ISA bus using the M16#, IO16#, and SBHE# signals to accommodate both 8- and 16-bit devices connected to the bus. The general purpose bus 72 provides the signals GPMEMCS16, GPIOCS16, and GPBHE for this same purpose.

These and other ISA bus and analogous general purpose bus features are described in more detail in the commonly assigned patent application, entitled "PC/AT-COMPATIBLE MICROCONTROLLER," previously incorporated herein by reference.

Thus, a general purpose bus with programmable timing enables the microcontroller M which includes this flexible bus to be coupled with a variety of peripheral devices. The general purpose bus provides an interface to a vast array of devices, including but not limited to ROMs, SRAMs, NVRAMs, encryption chips, UARTs, a Super I/O controller chip, HDLC controllers, and keyboard controllers. Furthermore, these devices may be coupled to the microcontroller without external support such as PALs, providing a glueless interface. The general purpose bus controller further provides an echo mode feature which allows accesses to internal peripheral devices connected to the general purpose bus to be echoed to pins on the microcontroller. Although the disclosed embodiment describes the general purpose bus as part of a microcontroller, systems other than microcontrollers may similarly employ such a general purpose bus.

The foregoing disclosure and description of the various embodiments are illustrative and explanatory thereof, and various changes in the descriptions of the microcontroller, the general purpose bus, the general purpose bus controller, programmable interface timing logic, register attributes, and other circuitry, the organization of the components, and the order and timing of steps taken, as well as in the details of the illustrated system may be made without departing from the spirit of the invention.

We claim:

1. A general purpose bus controller for supporting a plurality of general purpose peripherals, comprising:
   a bus interface, to interface a plurality of general purpose bus interface timing signals with the plurality of general purpose peripherals; and
   programmable interface timing logic to generate general purpose bus cycle parameters for the plurality of general purpose bus interface timing signals wherein the plurality of general purpose peripherals have two or more different general purpose bus cycle parameters and the plurality of general purpose peripherals share the bus interfaces.

2. The general purpose bus controller of claim 1, wherein a general purpose bus cycle associated with the general purpose bus cycle parameters comprises an offset portion, a pulse width portion, and a recovery time portion.

3. The general purpose bus controller of claim 2, the programmable interface timing logic comprising:
   an offset register, to store an offset register value corresponding to the offset portion of the general purpose bus cycle;
   a pulse width register, to store a pulse width value corresponding to the pulse width portion of the general purpose bus cycle; and
   a recovery time register, to store a recovery time value corresponding to the recovery time portion of the general purpose bus cycle.

4. The general purpose bus controller of claim 1, wherein the plurality of general purpose bus interface timing signals comprises a plurality of chip select signals, a plurality of read strobe signals, and a plurality of write strobe signals.

5. The general purpose bus controller of claim 4, wherein the plurality of read strobe signals comprises an I/O read signal or a memory read signal.

6. The general purpose bus controller of claim 1, wherein the plurality of general purpose bus interface timing signals comprises a plurality of address latch enable signals.

7. A microcontroller, comprising:
   a processor;

a processor bus coupled to the processor;

a general purpose bus controller, coupled to the processor, the general purpose bus controller comprising:

a bus interface, to interface a plurality of general purpose bus interface timing signals with a plurality of general purpose peripherals; and programmable interface timing logic to generate general purpose bus cycle parameters for the plurality of general purpose bus interface timing signals wherein the plurality of general purpose peripherals have two or more different general purpose bus cycle parameters and the plurality of general purpose peripherals share the bus interface; and a general purpose bus with timing provided by the programmable interface timing logic.

8. The microcontroller of claim 7, wherein a general purpose bus cycle associated with the general purpose bus cycle parameters comprises an offset portion, a pulse width portion, and a recovery time portion.

9. The microcontroller of claim 7, the programmable interface timing logic comprising:

an offset register, to store an offset register value corresponding to the offset portion of the general purpose bus cycle;

a pulse width register, to store a pulse width value corresponding to the pulse width portion of the general purpose bus cycle; and a recovery time register, to store a recovery time value corresponding to the recovery time portion of the general purpose bus cycle.

10. The microcontroller of claim 7, wherein the plurality of general purpose bus interface timing signals comprises a plurality of chip select signals, a plurality of read strobe signals, and a plurality of write strobe signals.

11. The microcontroller of claim 7, wherein the plurality of read strobe signals comprises an I/O read signal or a memory read signal.

12. The microcontroller of claim 7, wherein the plurality of general purpose bus interface timing signals comprises a plurality of address latch enable signals.

13. The microcontroller of claim 7, the general purpose bus comprising:

a plurality of chip select signals;

a memory read signal;

a memory write signal;

an I/O read signal;

an I/O write signal;

an address enable signal; and a data buffer enable signal.

14. The microcontroller of claim 13, wherein the general purpose bus further comprises a bus size signal to indicate whether the bus operates at 8- or 16-bit width and a ready signal to indicate completion of the bus cycle.

15. A system for supporting a plurality of peripheral devices, comprising:

a microcontroller, comprising:

a processor;

a processor bus coupled to the processor;

a general purpose bus controller, coupled to the processor, the general purpose bus controller comprising:

a bus interface, to interface a plurality of general purpose bus interface timing signals with a plurality of general purpose peripherals; and programmable interface timing logic to generate general purpose bus cycle parameters for the plurality of general purpose bus interface timing signals wherein the plurality of general purpose peripherals have two or more different general purpose bus cycle parameters and the plurality of general purpose peripherals share the bus interface;

a general purpose bus with timing provided by the programmable interface timing logic; and a plurality of signals for coupling the microcontroller to the plurality of general purpose peripherals, wherein the programmable interface timing logic provides the general purpose bus cycle parameters for the plurality of general purpose bus interface timing signals.

16. The system of claim 15, the programmable interface timing logic comprising:

an offset register, to store an offset register value corresponding to the offset portion of a general purpose bus cycle for the general purpose bus;

a pulse width register, to store a pulse width value corresponding to the pulse width portion of the general purpose bus cycle; and a recovery time register, to store a recovery time value corresponding to the recovery time portion of the general purpose bus cycle.

17. The system of claim 15, wherein a general purpose bus cycle for the general purpose bus comprises an offset portion, a pulse width portion, and a recovery time portion.

18. The system of claim 15, wherein the plurality of general purpose bus interface timing signals comprises a plurality of chip select signals, a plurality of read strobe signals, a plurality of write strobe signals, and a plurality of address latch enable signals.

19. A microcontroller, comprising:

a processor;

a processor bus coupled to the processor;

a general purpose bus controller, coupled to the processor, the general purpose bus controller comprising:

a bus interface, to interface a first plurality of general purpose bus interface timing signals for a plurality of general purpose peripherals which are internal to the microcontroller and a second plurality of general purpose bus interface timing signals for a plurality of general purpose peripherals which are external to the microcontroller;

fixed timing logic to generate general purpose bus cycle parameters for the first plurality of general purpose bus interface timing signals; and programmable interface timing logic to generate general purpose bus cycle parameters for the second plurality of general purpose bus interface timing signals; and a general purpose bus with timing provided by the programmable interface timing logic and the fixed timing logic.

20. The microcontroller of claim 19, wherein the first plurality of general purpose bus interface timing signals serve to access peripherals internal to the microcontroller and the second plurality of general purpose bus interface timing signals serve to access peripherals external to the microcontroller.

21. The microcontroller of claim 20, further comprising:

an echo mode register to enable a mode wherein the first plurality of general purpose bus interface timing signals may be detected external to the microcontroller.

* * * * *